3,099,656
Δ³,⁵-PREGNADIENE DERIVATIVES
John A. Zderic, Palo Alto, Calif., Otto Halpern, Mexico City, Mexico, and Jose Iriarte, Zurich, Switzerland, assignors, by mesne assignments, to Syntex Corporation, a corporation of Panama
No Drawing. Filed Feb. 26, 1962, Ser. No. 175,810
16 Claims. (Cl. 260—239.55)

The present invention relates to novel cyclopentanophenanthrene derivatives and to a process for the production thereof.

More particularly the present invention relates to novel 4-methyl-Δ³,⁵-pregnadiene derivatives.

The novel compounds of the present invention which are progestational agents with anti-estrogenic, anti-gonadotropic and anti-ovulatory properties are represented by the following formula:

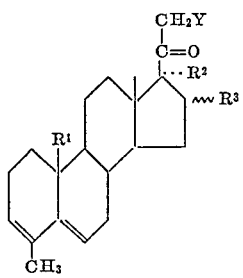

In the above formula Y represents hydrogen or fluorine; R¹ represents hydrogen or methyl; R² represents hydroxyl or a hydrocarbon carboxylic acyloxy group of less than 12 carbon atoms; R³ represents hydrogen, α-methyl, β-methyl, α-hydroxy or α-acyloxy; in addition R² and R³ together may represent the group:

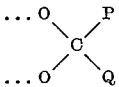

wherein P may be a lower alkyl group and Q represents a lower alkyl, or an aryl or aralkyl group, each containing up to 8 carbon atoms.

The acyloxy groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process exemplified by the following equation:

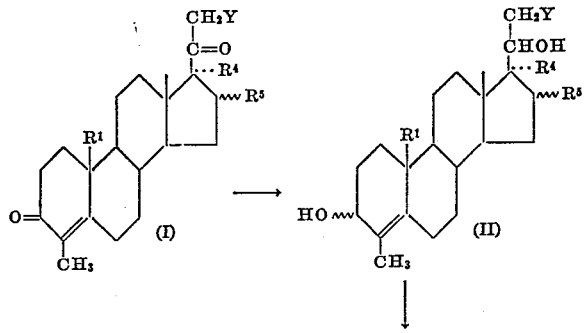

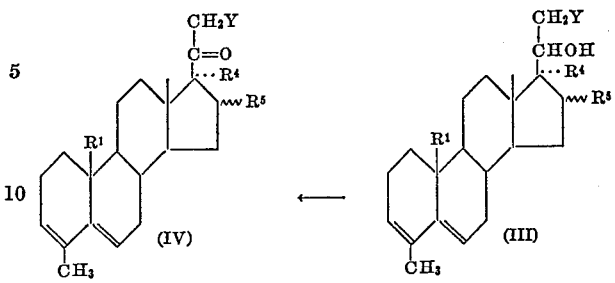

In the above formulas Y and R¹ have the same meaning as previously set forth; R⁴ may be a hydrocarbon carboxylic acyloxy group of less than 12 carbon atoms; R⁵ represents hydrogen, α-methyl, β-methyl or α-acyloxy; in addition R⁴ and R⁵ together may represent the group

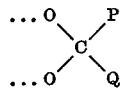

wherein P and Q have the same meaning as hereinbefore described.

In practicing the process outlined above, the starting compound which is a 4-methyl-Δ⁴-pregnene-3,20-dione derivative (I) is reduced with a double metal hydride, preferably sodium borohydride to give the corresponding 3β,20β-diol and the 3α-isomer thereof (II). Reaction of this mixture in an acid medium, preferably 50% acetic acid, at steam bath temperature, for a period of time of the order of one hour, affords the corresponding 4-methyl-Δ³,⁵-pregnadien-20β-ol (III). Oxidation of this latter compound, preferably with chromium trioxide in pyridine yields the corresponding 4-methyl-Δ³,⁵-pregnadien-20-one (IV).

The compounds obtained by the above described procedures, which have a 17α-acyloxy group present in the molecule, yields the corresponding 17α-free hydroxyl derivative by conventional saponification, preferably with an alkali metal hydroxide.

The final compounds of the present invention having a ketonide at the 16,17-positions produce the 16α,17α diols by hydrolysis with a strong acid, preferably formic acid.

The free alcohols thus obtained, are conventionally acylated with an excess of an acylating agent, as for example an anhydride derived from a hydrocarbon carboxylic acid of the type described hereinbefore in the presence of p-toluenesulfonic acid, thus affording correspondingly the 17α-monoacylates or the 16α,17α-diacylates. The latter compounds, upon selective saponification in a mild alkaline medium yields the corresponding 16α-hydroxy-17α-acyloxy derivative which by further acylation gives the respective 16,17-diesters with the same or different ester groups.

Alternatively, conventional acylation of the 16α,17α-diol in the absence of p-toluenesulfonic acid yields the corresponding 16α-acyloxy-17α-hydroxy compound which upon further acylation in the presence of p-toluenesulfonic acid with the same or a different acylation agent gives the corresponding 16,17-diester with the same or different ester groups.

The following specific examples serve to illustrate but are not intended to limit the scope of the present invention:

PREPARATION 1

Progesterone was converted into a mixture of two isomeric 20-enol acetates of the enolactone of 5,20-diketo-3,5-seco-A-nor-pregnan-3-carboxylic acid by the method of Fujimoto and Prager, J. Am. Chem. Soc. 75, 3260

(1953), and thereafter reacted with ethyl magnesium bromide followed by hydrolysis of the formed product with a base, in accordance with the technique described by Sondheimer and Mazur U.S. Pat. 2,891,075 thus yielding 4-methyl progesterone.

Following the same procedures, the starting compounds listed below were transformed into the corresponding 4-methyl products hereinafter disclosed. The 17α-acetoxy groups, which are hydrolyzed in the process, are reintroduced by final acetylation.

| Starting Compounds | Products |
| --- | --- |
| 19-nor-progesterone | 4-methyl-19-nor-progesterone. |
| 17α-acetoxy-progesterone | 4-methyl-17α-acetoxy-progesterone. |
| 16α-methyl-progesterone | 4, 16α-dimethyl-progesterone. |
| 16β-methyl-progesterone | 4, 16β-dimethyl-progesterone. |
| 16α-methyl-17α-acetoxy-progesterone. | 4, 16α-dimethyl-17α-acetoxy progesterone. |
| 21-fluoro-17α-acetoxy-progesterone | 4-methyl-21-fluoro-17α-acetoxy progesterone. |
| 16α, 17α-dihydroxy-progesterone-acetonide. | 4-methyl-16α, 17α-dihydroxy-progesterone-acetonide. |
| 16α, 17α-dihydroxy-progesterone-acetophenonide. | 4-methyl-16α- 17α-dihydroxy-progesterone acetophenonide. |

PREPARATION 2

A culture of Streptomyces roseochromogenus ATCC 3347 was prepared in an inclined agar medium containing 1% of glucose and 1% of yeast extract. 1 cc. of a suspension of this culture was then used to innoculate each one of a series of 250 cc. flasks containing 50 cc. of a sterilized aqueous medium of 2% peptone and 5% corn syrup, the mixtures were then incubated in a shaking machine at 28° C. under aereation for a period of 24–48 hours. There was thus obtained a vegetating growing culture of Streptomyces roseochromogenus which was used for the subsequent incubation of the steroid.

10 mg. of 19-nor-Δ⁵-pregnen-3β-ol-20-one-acetate (obtained by conventional acetylation of the free 3β-alcohol, prepared according to our copending Patent application Ser. No. 164,626, filed January 5, 1962) were added to each 50 cc. of the vegetating culture of Streptomyces roseochromagenus, obtained as described above. The mixture was stirred for 48–72 hours with aeration and then extracted several times with methylene dichloride. The extract was washed with water, dried over anhydrous sodium sulfate, filtered and evaporated under reduced pressure.

The residue was purified by chromatography on silica gel thus giving 19-nor-Δ⁵-pregnene-3β,16α-diol-20-one-3-acetate.

A solution of 8 g. of the latter steroid in 100 cc. of chloroform containing a few drops of pyridine was cooled to 0° C. and slowly treated under stirring with a cooled solution of chlorine in chloroform containing 1.05 molar equivalents of chlorine. The mixture was allowed to reach room temperature, the excess of chlorine was removed by flushing with dry air and the solution was washed with 5% aqueous sodium bicarbonate solution and subsequently with water, dried over anhydrous sodium sulfate and evaporated to dryness. Crystallization of the residue from methanol-benzene afforded 5α,6β-dichloro-19-nor-pregnane-3β,16α-diol-20-one-3-acetate.

A solution of 5 g. of the latter 5α,6β-dichloro compound in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 5α,6β-dichloro-19-nor-pregnane-3β,16α-diol-20-one-3-acetate-16-tosylate.

The total crude compound was kept at 50° C. with 5 g. of anhydrous sodium acetate and 160 cc. of ethanol during 2.5 hours. Chloroform and water were added. The aqueous layer was extracted several times with chloroform and the combined organic extracts were washed with concentrated sodium bicarbonate solution, then with water, dried over sodium sulfate and evaporated to dryness. Chromatography and recrystallization of the solid fractions from acetone-hexane afforded 5α,6β-dichloro-19-nor-Δ¹⁶-pregnen-3β-ol-20-one-acetate.

50 cc. of dioxane containing 3 g. of the latter steroid and 3.46 cc. of pyridine were allowed to stand at room temperature for 6 days with 2.0 g. of osmium tetroxide. The mixture was then saturated with hydrogen sulfide and filtered through a pad of filter aid. The resultant colored filtrate was evaporated to dryness and taken up in 50 ml. of methanol. By stirring for 20 minutes with 10 g. of neutral alumina and 2 g. of decolorizing carbon and then filtering, the solution was almost completely decolorized and gave upon evaporation to dryness the crude material which was purified by chromatography on florisil. Recrystallization of the solid fractions from acetone-ether gave 5α,6β-dichloro-19-nor-pregnane-3β,16α,17α-triol-20-one-3-acetate.

To 120 cc. of acetone containing 1 g. of the last named triol were added 30 drops of 78% perchloric acid. After 1 hour at room temperature 30 drops of pyridine were added and the resulting solution was evaporated to dryness under reduced pressure. 30 cc. of water were added to the residue and it was then extracted several times with 80 cc. of ethyl acetate. The combined extracts were washed to neutrality with water, dried over sodium sulfate and evaporated to dryness. The residue upon trituration with methanol gave a crude 16,17-acetonide. Recrystallizations from the same solvent furnished 16α,17α-isopropylidenedioxy-5α,6β-dichloro-19-nor - pregnan-3β-ol-20-one-acetate.

A suspension of 1 g. of the latter steroid in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone hexane to yield 16α,17α-isopropylidenedioxy-5α,6β-dichloro-19-nor-pregnan-3β-ol-20-one.

To a solution of 1 g. of the latter 5α,6β-dichloro compound in 200 cc. of acetone, at room temperature and under a nitrogen atmosphere, there were added, 60 cc. of freshly prepared chromous chloride solution. After 5 minutes the acetone was removed under reduced pressure, water was added and the precipitate filtered off and dried. Recrystallization from acetone-hexane yielded 16α,17α-isopropylidenedioxy - 19 - nor-Δ⁵-pregnen - 3β-ol-20-one.

A solution of 1 g. of the latter steroid in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 45 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 16α,17α-isopropylidenedioxy-19-nor-Δ⁴-pregnene-3,20-dione, which upon treatment in accordance with preparation 1, yielded 4-methyl-16α,17α-isopropylidenedioxy-19-nor-Δ⁴-pregnene-3,20-dione.

PREPARATION 3

A mixture of 6.6 g. of 19-nor-Δ⁵-pregnen-3β-ol-20-one-acetate 2.7 g. of p-toluenesulfonic acid and 300 cc. of acetic anhydride was submitted to a slow distillation; during 5 hours. The residue was cooled and poured into ice water. The product was then extracted with ether, the extract washed successively with an aqueous solution of sodium carbonate and water to neutral, dried and evaporated to dryness. The residue consisted of 19-nor-$\Delta^{5,17(20)}$-pregnadiene-3$\beta$,20$\beta$-diol diacetate which was utilized in the following step without purification.

6 g. of this crude diacetate were treated with 480 cc. of a 1.2 molar solution of perbenzoic acid in benzene (2.2 molar equivalents), at room temperature and in the dark, for 20 hours. Water was then added, the organic layer separated, washed with an aqueous solution of sodium bicarbonate, then with water, dried with anhydrous sodium sulfate and evaporated to dryness. The residue consisted of the crude 5$\alpha$,6$\alpha$;17$\alpha$,20$\alpha$-bis-oxido-19-nor-pregnane-3$\beta$,20$\beta$-diol diacetate.

This crude oxido compound was treated with 500 cc. of 1% methanolic solution of potassium hydroxide at room temperature for 1 hour, the mixture was neutralized by addition of acetic acid, concentrated to small volume under reduced pressure, the product was precipitated by addition of ice water, filtered off, washed with water, dried and recrystallized from acetone-methanol, thus yielding 5$\alpha$,6$\alpha$-oxido-19-nor-pregnane-3$\beta$,17$\alpha$-diol-20-one-3-acetate.

To 5 g. of the latter steroid in 80 cc. of glacial acetic acid, there was added a mixture of 6 g. of sodium iodide, 1.6 g. of sodium acetate, 320 mg. of zinc and 2 drops of water. While cooling in an ice bath and stirring, there were added to the resulting mixture, 800 mg. of zinc dust in small portions. The stirring was continued for 6 hours and the temperature allowed to attain 25° C.

The reaction mixture was filtered and the filtrate diluted with ice water, alkalized with sodium bicarbonate and extracted with ethyl acetate. The extract was washed to neutral, dried over anhydrous sodium sulfate and evaporated to dryness. Crystallization from acetone-hexane yielded 19-nor-$\Delta^5$-pregnene-3$\beta$,17$\alpha$-diol-20-one-3-acetate.

To a solution of 5 g. of the latter steroid in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19-nor-$\Delta^5$-pregnene-3$\beta$,17$\alpha$-diol-20-one diacetate.

A suspension of 1 g. of the last named compound, in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 17$\alpha$-acetoxy-19-nor-$\Delta^5$-pregnen-3$\beta$-ol-20-one.

The latter steroid was treated by the Oppenauer procedure, as described in Preparation 2, thus giving 17$\alpha$-acetoxy-19-nor-$\Delta^4$-pregnen-3,20-dione.

The last named ketone, was treated in accordance with Preparation 1, thus yielding 4-methyl-17$\alpha$-acetoxy-19-nor-$\Delta^4$-pregnen-3,20-dione.

PREPARATION 4

To a mixture of 1 g. of 5$\alpha$,6$\beta$-dichloro-19-nor-$\Delta^{16}$-pregnen-3$\beta$-ol-20-one acetate, 1 g. of cuprous chloride and 30 cc. of anhydrous tetrahydrofuran was added, while stirring and cooling, 50 cc. of tetrahydrofuran, containing 5 mol. equiv. of methyl magnesium bromide.

The mixture was stirred for 2 hours at 28° C., then poured into ice-water, containing dilute hydrochloric acid. The product was extracted with methylene chloride, the extract washed to neutral with water and dried over anhydrous sodium sulfate. Evaporation of the solvent at reduced pressure gave a residue, which was purified by crystallization from methylene chloride-hexane to afford 16$\alpha$-methyl-5$\alpha$,6$\beta$-dichloro-19-nor-pregnan-3$\beta$-ol-20-one.

The latter compound was treated with chromous chloride solution, as described in Preparation 2, thus giving 16$\alpha$-methyl-19-nor-$\Delta^5$-pregnen-3$\beta$-ol-20-one, which upon conventional acetylation in pyridine afforded the corresponding 3-acetate.

The latter compound, was treated in accordance with Preparation 3, thus giving successively:

16$\alpha$-methyl-19-nor-$\Delta^{5,17(20)}$-pregnadiene-3$\beta$,20$\beta$-diol diacetate,
16$\alpha$ - methyl - 5$\alpha$,6$\alpha$;17$\alpha$,20$\alpha$-bis-oxido-19-nor-pregnane-3$\beta$,20$\beta$-diol diacetate,
16$\alpha$-methyl-5$\alpha$,6$\alpha$-oxido-19-nor-pregnane-3$\beta$,17$\alpha$-diol-20-one-3-acetate,
16$\alpha$-methyl-19-nor-$\Delta^5$-pregnene-3$\beta$,17$\alpha$-diol-20-one-3-acetate,
16$\alpha$-methyl-19-nor-$\Delta^5$-pregnene-3$\beta$,17$\alpha$-diol-20-one-diacetate,
16$\alpha$-methyl-17$\alpha$-acetoxy-19-nor-$\Delta^5$-pregnen-3$\beta$-ol-20-one,
16$\alpha$-methyl-17$\alpha$-acetoxy-19-nor-$\Delta^4$-pregnen-3,20-dione and
4,16$\alpha$-dimethyl-17$\alpha$-acetoxy-19-nor-$\Delta^4$-pregnen-3,20-dione.

PREPARATION 5

A cooled solution of 4 g. of 4,16$\alpha$-dimethyl-17$\alpha$-acetoxy-19-nor-$\Delta^4$-pregnene-3,20-dione in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving 4,16$\alpha$-dimethyl-21-iodo-17$\alpha$-acetoxy-19-nor-$\Delta^4$-pregnene-3,20-dione. The crude product was dried in vacuum, dissolved in 20 cc. of acetonitrile and treated dropwise with 1.4 g. of silver fluoride dissolved in 3 cc. of water. After a short time, silver iodide started to separate leaving the 21-fluoro-pregnan derivative in solution. The mixture was kept for 24 hours at room temperature and filtered. Concentration of the filtrate under vacuum gave a crude product which after crystallization from methanol-acetone yielded 4,16$\alpha$-dimethyl-21-fluoro-17$\alpha$-acetoxy-19-nor-$\Delta^4$-pregnene-3,20-dione.

Following the same procedures, 4-methyl-16$\alpha$,17$\alpha$-isopropylidendioxy - 19 - nor - $\Delta^4$-pregnene-3,20-dione and 4-methyl - 17$\alpha$-acetoxy-19-nor-$\Delta^4$-pregnene-3,20-dione were converted first into the corresponding 21-iodo derivatives and thereafter respectively into: 4-methyl-21-fluoro-16$\alpha$,17$\alpha$ - isopropylidendioxy - 19 - nor-$\Delta^4$-pregnene-3,20-dione and 4-methyl-21-fluoro-17$\alpha$-acetoxy-19-nor-$\Delta^4$-pregnene-3,20-dione.

Example I

A solution of 2 g. of sodium borohydride in 30 cc. of methanol was added with stirring to a solution of 2 g. of 4-methyl progesterone in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave a mixture of 4-methyl-$\Delta^4$-pregnene-3$\beta$,20$\beta$-diol and the 3$\alpha$-isomer thereof.

1 g. of the above mixture was heated on the steam bath with 100 cc. of 50% acetic acid under nitrogen for 1 hour, it was then concentrated under vacuum to a small volume and poured into water. The precipitate was collected, washed well with water, dried and recrystallized from acetone-hexane, thus furnishing 4-methyl-$\Delta^{3,5}$-pregnadien-20$\beta$-ol.

The starting compounds listed below, were treated following the above techniques, thus giving first a mixture of the corresponding 3$\beta$,20$\beta$-diols and 3$\alpha$-isomers thereof and thereafter the respective products disclosed hereinafter.

| Starting Compounds | Products |
|---|---|
| 4-methyl-19-nor-progesterone | 4-methyl-19-nor-$\Delta^{3,5}$-pregnadien-20β-ol. |
| 4-methyl-17α-acetoxy-progesterone. | 4-methyl-17α-acetoxy-$\Delta^{3,5}$-pregnadien-20β-ol. |
| 4,16α-dimethyl-progesterone | 4,16α-dimethyl-$\Delta^{3,5}$-pregnadien-20β-ol. |
| 4,16β-dimethyl-progesterone | 4,16β-dimethyl-$\Delta^{3,5}$-pregnadien-20β-ol. |
| 4,16α-dimethyl-17α-acetoxy-progesterone. | 4,16α-dimethyl-17α-acetoxy-$\Delta^{3,5}$-pregnadien-20β-ol. |
| 4-methyl-21-fluoro-17α-acetoxy-progesterone. | 4-methyl-21-fluoro-17α-acetoxy-$\Delta^{3,5}$-pregnadien-20β-ol. |
| 4-methyl-16α,17α-dihydroxy-progesterone-acetonide. | 4-methyl-$\Delta^{3,5}$-pregnadiene-16α,17α,20β-triol-16,17-acetonide. |
| 4-methyl-16α,17α-dihydroxy-progesterone acetophenonide. | 4-methyl-$\Delta^{3,5}$-pregnadiene-16α,17α,20β-triol-16,17-acetophenonide. |

*Example II*

A solution of 6 g. of 4-methyl-$\Delta^{3,5}$-pregnadien-20β-ol obtained according to Example 1, in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 4-methyl-$\Delta^{3,5}$-pregnadien-20-one.

Following the above method there were treated the starting compounds listed below, thus yielding the corresponding products hereinafter set forth.

| Starting Compounds | Products |
|---|---|
| 4-methyl-19-nor-$\Delta^{3,5}$-pregnadien-20β-ol. | 4-methyl-19-nor-$\Delta^{3,5}$-pregnadien-20-one. |
| 4-methyl-17α-acetoxy-$\Delta^{3,5}$-pregnadien-20β-ol. | 4-methyl-17α-acetoxy-$\Delta^{3,5}$-pregnadien-20-one. |
| 4,16α-dimethyl-$\Delta^{3,5}$-pregnadien-20β-ol. | 4,16α-dimethyl-$\Delta^{3,5}$-pregnadien-20-one. |
| 4,16β-dimethyl-$\Delta^{3,5}$-pregnadien-20β-ol. | 4,16β-dimethyl-$\Delta^{3,5}$-pregnadien-20-one. |
| 4,16α-dimethyl-17α-acetoxy-$\Delta^{3,5}$-pregnadien-20β-ol. | 4,16α-dimethyl-17α-acetoxy-$\Delta^{3,5}$-pregnadien-20-one. |
| 4-methyl-21-fluoro-17α-acetoxy-$\Delta^{3,5}$-pregnadien-20β-ol. | 4-methyl-21-fluoro-17α-acetoxy-$\Delta^{3,5}$-pregnadien-20-one. |
| 4-methyl-$\Delta^{3,5}$-pregnadiene-16α,17α,20β-triol-16,17-acetonide. | 4-methyl-$\Delta^{3,5}$-pregnadiene-16α,17α-diol-20-one-16,17-acetonide. |
| 4-methyl-$\Delta^{3,5}$-pregnadiene-16α,17α,20β-triol-16,17-acetophenonide. | 4-methyl-$\Delta^{3,5}$-pregnadiene-16α,17α-diol-20-one-16,17-acetophenonide. |

*Example III*

A solution of 0.17 g. of potassium hydroxide in 0.2 cc. of water and 2.5 cc. of methanol was added over 30 minutes to a boiling solution of 1 g. of 4-methyl-17α-acetoxy-$\Delta^{3,5}$-pregnadien-20-one, in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced 4-methyl-$\Delta^{3,5}$-pregnadien-17α-ol-20-one.

Following the same technique there were treated 4,16α-dimethyl - 17α - acetoxy - $\Delta^{3,5}$ - pregnadien - 20 - one and 4 - methyl - 21 - fluoro - 17α - acetoxy - $\Delta^{3,5}$ - pregnadien - 20-one, thus affording correspondingly: 4,16α-dimethyl-$\Delta^{3,5}$-pregnadien-17α-ol-20-one and 4-methyl-21-fluoro-$\Delta^{3,5}$-pregnadien-17α-ol-20-one.

*Example IV*

To a solution of 5 g. of 4-methyl-$\Delta^{3,5}$-pregnadien-17α-ol-20-one in 100 cc. of anhydrous benzene there were added 1 g. of p-toluenesulfonic acid and 10 cc. of propionic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 4-methyl-$\Delta^{3,5}$-pregnadien-17α-ol-20-one-propionate.

Following the same technique there were treated 4,16α-dimethyl-$\Delta^{3,5}$-pregnadien-17α-ol-20-one and 4-methyl-21-fluoro-$\Delta^{3,5}$-pregnadien-17α-ol-20-one, thus affording correspondingly 4,16α-dimethyl - $\Delta^{3,5}$ - pregnadien-17α-ol-20-one-propionate and 4-methyl - 21 - fluoro-$\Delta^{3,5}$-pregnadien-17α-ol-20-one-propionate.

*Example V*

Following the foregoing procedure, but substituting propionic anhydride by caproic anhydride, there were obtained 4-methyl-$\Delta^{3,5}$-pregnadien-17α-ol-20-one caproate, 3,16α-dimethyl-$\Delta^{3,5}$-pregnadien-17α-ol-20-one caproate, and 4-methyl-21-fluoro-$\Delta^{3,5}$-pregnadien-17-ol-20-one caproate.

*Example VI*

1 g. of 4-methyl-$\Delta^{3,5}$-pregnadiene-16α,17α-diol-20-one-16,17-acetonide was heated on the steam bath with 20 cc. of 60% formic acid for 1 hour, cooled, diluted with water and the precipitate was collected, washed with water, dried, and recrystallized from acetone-hexane, thus affording 4-methyl-$\Delta^{3,5}$-pregnadiene-16α,17α-diol-20-one.

*Example VII*

The preceding compound was treated following the procedure described in Example 4, thus giving 4-methyl-$\Delta^{3,5}$-pregnadiene-16α,17α-diol-20-one-16,17-dipropionate.

*Example VIII*

2 g. of the latter compound was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 4-methyl-$\Delta^{3,5}$-pregnadiene-16α,17α-diol-20-one-17-propionate.

*Example IX*

A mixture of 1 g. of the foregoing monoester 4 cc. of pyridine and 2 cc. of acetic anhydride was kept at room temperature overnight, poured into ice water, the formed precipitate was filtered, washed with water and dried. Crystallization from acetone-hexane gave 4-methyl-$\Delta^{3,5}$-pregnadiene - 16α,17α - diol - 20 - one - 16 - acetate - 17 - propionate.

*Example X*

A mixture of 1 g. of 4-methyl-$\Delta^{3,5}$-pregnadiene-16α,17α-diol-20-one; 4 cc. of pyridine and 2 cc. of caproic anhydride was kept at room temperature overnight, poured into ice water, the formed precipitate was filtered, washed with water and dried. Crystallization from acetone-hexane gave 4-methyl-$\Delta^{3,5}$-pregnadiene-16α,17α-diol-20-one-16-caproate.

*Example XI*

4-16α - dimethyl - 17α - acetoxy - 19 - nor - $\Delta^4$ - pregnene-3,20-dione was successively treated in accordance with Examples I and II, thus respectively yielding 4,16α-dimethyl-17α-acetoxy-19-nor-$\Delta^{3,5}$-pregnadien-20β-ol and 4,16α - dimethyl - 17α - acetoxy - 19 - nor - $\Delta^{3,5}$ - pregnadien-20-one.

*Example XII*

4 - methyl - 16α,17α - isopropylidendioxy - 19 - nor - $\Delta^4$-pregnene-3,20-dione was consecutively treated according to Examples I and II, furnishing respectively 4-methyl - 16α,17α - isopropylidendioxy - 19 - nor - $\Delta^{3,5}$ - pregnadien-20β-ol and 4-methyl-16α,17α-isopropylidendioxy-19-nor-$\Delta^{3,5}$-pregnadien-20-one.

*Example XIII*

4 - methyl - 17α - acetoxy - 19 - nor - $\Delta^4$ - pregnene - 3,20-dione was treated following successively the procedures described in Examples I and II, thus giving respectively 4-methyl-17α-acetoxy-19-nor-Δ³,⁵-pregnadien-20β-ol and 4-methyl-17α-acetoxy-19-nor-Δ³,⁵-pregnadien-20-one.

*Example XIV*

4,16α - dimethyl - 21 - fluoro - 17α - acetoxy - 19 - nor - Δ⁴-pregnene-3,20-dione was successively treated in accordance with Example I and II, thus giving correspondingly 4,16α - dimethyl - 21 - fluoro - 17α - acetoxy - 19 - nor - Δ³,⁵-pregnadien-20β-ol and 4,16α-dimethyl-21-fluoro-17α-acetoxy-19-nor-Δ³,⁵-pregnadien-20-one.

*Example XV*

4 - methyl - 21 - fluoro - 16α,17α - isopropylidendioxy - 19-nor-Δ⁴-pregnene-3,20-dione was successively treated according to Examples I and II, thus furnishing respectively: 4-methyl-21-fluoro-16α,17α-isopropylidendioxy-19-nor-Δ³,⁵-pregnadien-20β-ol and 4-methyl-21-fluoro-16α,17α-isopropylidendioxy-19-nor-Δ³,⁵-pregnadien-20-one.

*Example XVI*

4 - methyl - 21 - fluoro - 17α - acetoxy - 19 - nor - Δ⁴ - pregnene-3,20-dione was treated following successively the procedures described in Examples I and II, thus producing respectively 4-methyl-21-fluoro-17α-acetoxy-19-nor-Δ³,⁵-pregnadien-20β-ol and 4-methyl-21-fluoro-17α-acetoxy-19-nor-Δ³,⁵-pregnadien-20-one.

*Example XVII*

4,16α - dimethyl - 17α - acetoxy - 19 - nor - Δ³,⁵ - pregnadien-20-one, 4,16α-dimethyl-21-fluoro-17α-acetoxy-19-nor-Δ³,⁵-pregnadien-20-one, 4-methyl-21-fluoro-17α-acetoxy-19-nor-Δ³,⁵-pregnadien-20-one and 4-methyl-17α-acetoxy-19-nor-Δ³,⁵-pregnadien-20-one were treated in accordance with Example III, yielding respectively: 4,16α-dimethyl-19-nor-Δ³,⁵-pregnadien-17α-ol-20-one, 4,16α-dimethyl - 21 - fluoro - 19 - nor - Δ³,⁵ - pregnadien - 17α - ol-24-one, 4-methyl-21-fluoro-19-nor-Δ³,⁵-pregnadien-17α-ol-20-one, and 4-methyl-19-nor-Δ³,⁵-pregnadien-17α-ol-20-one.

*Example XVIII*

4 - methyl - 21 - fluoro - 16α,17α - isopropylidendioxy - 19-nor-Δ³,⁵-pregnadien-20-one and 4-methyl-16α,17α-isopropylidendioxy - 19 - nor - Δ³,⁵ - pregnadien-20-one were treated following the procedure described in Example VI thus affording respectively 4-methyl-21-fluoro-19-nor-Δ³,⁵-pregnadiene-16α,17α-diol-20-one and 4-methyl-19-nor-Δ³,⁵-pregnadiene-16α,17α-diol-20-one.

We claim:
1. A compound of the following formula:

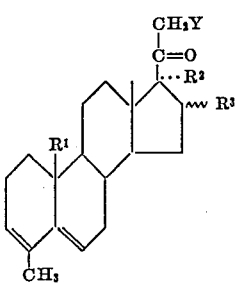

wherein Y is selected from the group consisting of hydrogen and fluorine; $R^1$ is a member of the group consisting of hydrogen and methyl; $R^2$ is selected from the group consisting of hydroxyl and a hydrocarbon carboxylic acyloxy group of less than 12 carbon atoms; $R^3$ is a member of the group consisting of hydrogen, α-methyl, β-methyl, α-hydroxyl and an α-hydrocarbon carboxylic acyloxy group of less than 12 carbon atoms, $R^2$ and $R^3$ together are in addition the group

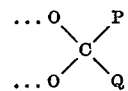

wherein P is a lower alkyl group and Q is selected from the group consisting of a lower alkyl, an aryl and an aralkyl group, each containing up to 8 carbon atoms.

2. 4-methyl-Δ³,⁵-pregnadien-20-one.
3. 4-methyl-19-nor-Δ³,⁵-pregnadien-20-one.
4. 4-methyl-17α-acetoxy-Δ³,⁵-pregnadien-20-one.
5. 4,16α-dimethyl-Δ³,⁵-pregnadien-20-one.
6. 4,16β-dimethyl-Δ³,⁵-pregnadien-20-one.
7. 4,16α-dimethyl-17α-acetoxy-Δ³,⁵-pregnadien-20-one.
8. 4 - methyl-21-fluoro-17α-acetoxy-Δ³,⁵-pregnadien-20-one.
9. 4 - methyl - Δ³,⁵ - pregnadiene - 16α,17α - diol-20-one-16,17-acetonide.
10. 4 - methyl - Δ³,⁵-pregnadiene - 16α,17α - diol-20-one-16,17-acetophenonide.
11. 4-methyl-Δ³,⁵-pregnadiene-16α,17α-diol-20-one.
12. 4-methyl-Δ³,⁵-pregnadien-17α-ol-20-one.
13. 4,16α-dimethyl-Δ³,⁵-pregnadien-17α-ol-20-one.
14. 4-methyl-21-fluoro-Δ³,⁵-pregnadien-17α-ol-20-one.

15. A process for the production of 4-methyl-Δ³,⁵-pregnadiene derivatives which comprises treating the corresponding 4-methyl-Δ⁴-pregnen-3-one with a double metal hydride, and reacting the resulting isomeric mixture of 3-hydroxy derivatives with an acid.

16. The process of claim 15 wherein the double metal hydride is sodium borohydride and the acid is 50% acetic acid.

No references cited.